United States Patent
Salisbury

(10) Patent No.: US 10,800,342 B2
(45) Date of Patent: Oct. 13, 2020

(54) BIKE RACK

(71) Applicant: Erben Inc., Moscow, ID (US)

(72) Inventor: Michael Salisbury, Moscow, ID (US)

(73) Assignee: Erben Inc., Moscow, ID (US)

( * ) Notice: Subject to any disclaimer, the term of this patent is extended or adjusted under 35 U.S.C. 154(b) by 41 days.

(21) Appl. No.: 15/993,746

(22) Filed: May 31, 2018

(65) Prior Publication Data
US 2019/0366939 A1 Dec. 5, 2019

(51) Int. Cl.
*B60R 9/10* (2006.01)
*B62H 3/04* (2006.01)

(52) U.S. Cl.
CPC ............... *B60R 9/10* (2013.01); *B62H 3/04* (2013.01); *B60Y 2200/13* (2013.01)

(58) Field of Classification Search
CPC .......... B60R 9/10; B60R 9/048; B60R 25/09; B60R 25/093; B62H 3/04; B62H 3/00; B62H 3/08; B62H 5/14; B60Y 2200/13
See application file for complete search history.

(56) References Cited

U.S. PATENT DOCUMENTS

| | | | | |
|---|---|---|---|---|
| 631,665 A * | 8/1899 | Potter | ...................... | B62H 3/00 211/5 |
| 661,677 A * | 11/1900 | Taylor | ...................... | B62H 3/00 211/22 |
| 2,639,813 A * | 5/1953 | Risvold | ................... | B62H 3/00 211/19 |
| 3,514,091 A * | 5/1970 | Engstrom | ............ | B25H 1/0014 269/68 |
| 3,635,352 A * | 1/1972 | Brooks | ..................... | A47F 5/05 211/47 |
| 5,320,227 A * | 6/1994 | Minoura | .............. | B25H 1/0014 211/22 |
| 5,660,286 A * | 8/1997 | Shea | ......................... | A47F 5/08 211/189 |
| 5,724,839 A * | 3/1998 | Thering | .................. | B60R 25/09 70/18 |
| 5,735,410 A | 4/1998 | Kallstrom | | |
| 5,873,275 A * | 2/1999 | Lukich | ................... | B60R 25/093 188/32 |
| 5,887,462 A | 3/1999 | Stone | | |
| 5,941,397 A * | 8/1999 | Buchanan | ................ | B62H 3/12 211/19 |
| 6,053,336 A * | 4/2000 | Reeves | .................... | B62H 3/08 211/17 |
| 6,241,104 B1 * | 6/2001 | Kraus | ...................... | B62H 3/04 211/20 |

(Continued)

FOREIGN PATENT DOCUMENTS

JP 2011068341 A 4/2011

*Primary Examiner* — Patrick D Hawn
(74) *Attorney, Agent, or Firm* — Lee & Hayes, P.C.

(57) ABSTRACT

A system including a first support having a leg member, a bracket operably coupled to the leg member, a first pad coupled to the leg member, and a support member coupled to at least one of the leg member or the first pad. A second support has an arm member rotatably coupled to the support member, an extendable strut coupled to the arm member, a brace coupled to the extendable strut, and a second pad coupled to the brace. A knock-over-center clamp operably couples to the first support and the second support and moves the second support between a clamped state and an open state.

20 Claims, 15 Drawing Sheets

(56) References Cited

U.S. PATENT DOCUMENTS

| | | | | |
|---|---|---|---|---|
| 6,434,980 B1 * | 8/2002 | Foster | | B60R 25/09 70/14 |
| 6,460,743 B2 * | 10/2002 | Edgerly | | B60R 9/048 224/324 |
| 6,575,310 B2 * | 6/2003 | Chamoun | | B66F 3/08 211/17 |
| 6,679,408 B1 | 1/2004 | Thomas et al. | | |
| 6,755,309 B1 * | 6/2004 | Runge | | B62H 3/04 211/183 |
| 6,854,630 B2 * | 2/2005 | Anderson | | B60R 9/06 224/506 |
| 6,877,613 B2 | 4/2005 | Bleazard | | |
| D507,226 S | 7/2005 | Oksa | | |
| 7,044,347 B1 * | 5/2006 | Pedrini | | B60R 9/10 224/324 |
| 7,051,909 B2 | 5/2006 | Gibson | | |
| 7,150,359 B1 * | 12/2006 | Lyons | | B62H 3/08 211/20 |
| 7,857,177 B2 * | 12/2010 | Reeves | | B60R 9/10 224/403 |
| 8,360,252 B1 * | 1/2013 | Fagan | | B62H 3/10 211/21 |
| 8,485,369 B2 * | 7/2013 | Glover | | B62H 3/04 211/22 |
| 8,733,141 B2 * | 5/2014 | Cheatham | | B60R 25/093 70/19 |
| 8,794,454 B2 * | 8/2014 | Bleazard | | B62H 3/12 211/19 |
| 9,230,524 B2 * | 1/2016 | Cortina | | G10G 5/00 |
| 9,381,866 B2 * | 7/2016 | Sautter | | B60R 9/10 |
| 10,160,398 B2 * | 12/2018 | Lee | | B60P 3/077 |
| 2006/0108297 A1 * | 5/2006 | Gay | | B62H 3/04 211/20 |
| 2006/0237376 A1 * | 10/2006 | Eakin | | B60P 3/077 211/20 |
| 2007/0017882 A1 * | 1/2007 | Lewis | | B62H 3/08 211/20 |
| 2007/0164065 A1 * | 7/2007 | Davis | | B60R 9/048 224/324 |

* cited by examiner

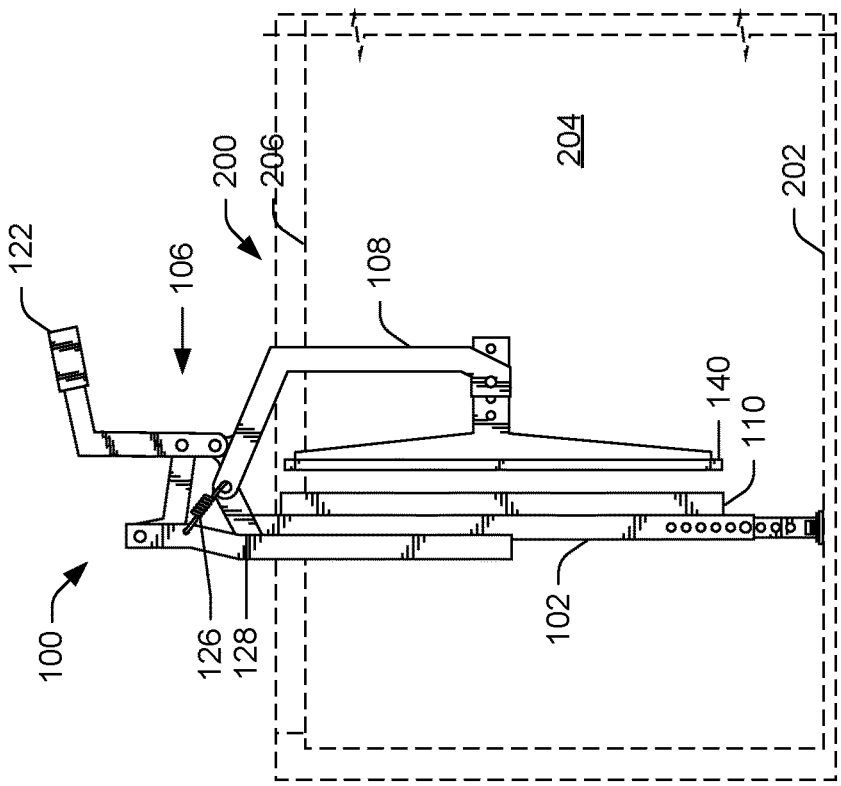
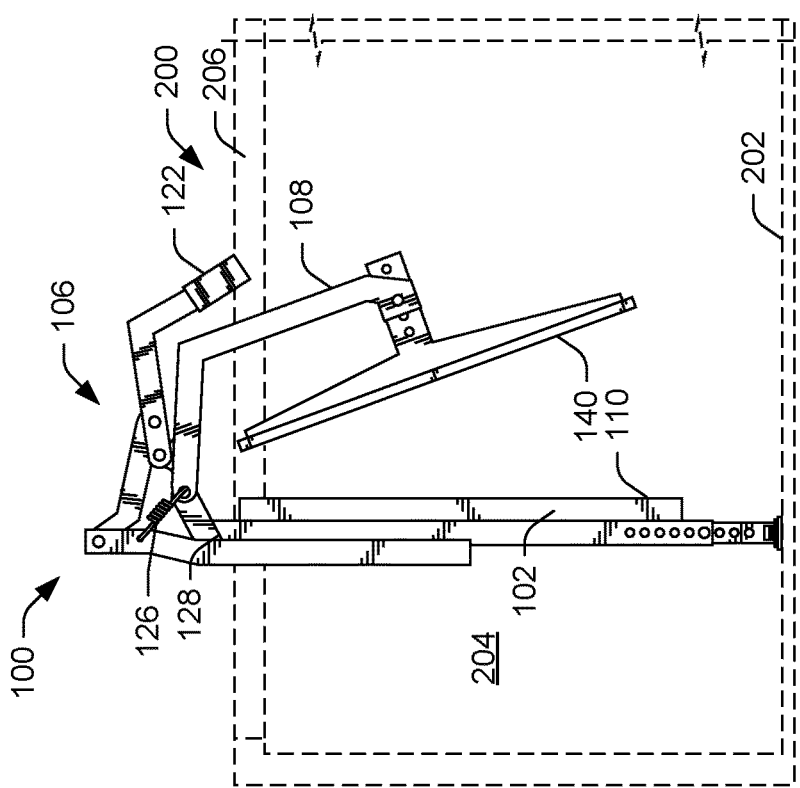
FIG. 3A
FIG. 3B

BIKE RACK

BACKGROUND

Vehicles may be equipped with carriers used to transport bicycles. These bicycle carriers may be mounted to a roof, bumper, hitch, or cargo area of the vehicle and may secure bicycles about their frames, wheels, or a combination thereof. For instance, some carriers use fork mounted assemblies that clamp forks of a bicycle, which systems require removing the front wheel. Other carriers utilize wheel trays that brace wheels of the bicycle or mounts that support the frame, as well as securing members that clasp around the frame, wheels, and/or rims.

Conventional bicycle carriers are typically complex and have numerous clamps or brackets. These carriers also require drilling, screwing, or bolting into frames, subframes, and/or other components of vehicles. As such, bicycle carriers are not easily removable and may cause structural or cosmetic damage to vehicles. Moreover, conventional carriers are limited in that they are only designed or configured to carry a certain type of bicycle and are not interchangeable between road bicycles, mountain bikes, BMX bikes, or snow bikes, for instance.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3A is a front view of the example bike rack of FIG. 1, showing the example bike rack usable in the truck bed and in an open state.

FIG. 3B is a front view of the example bike rack of FIG. 1, showing the example bike rack usable in the truck bed and in a clamped state.

DETAILED DESCRIPTION

Figure 1:
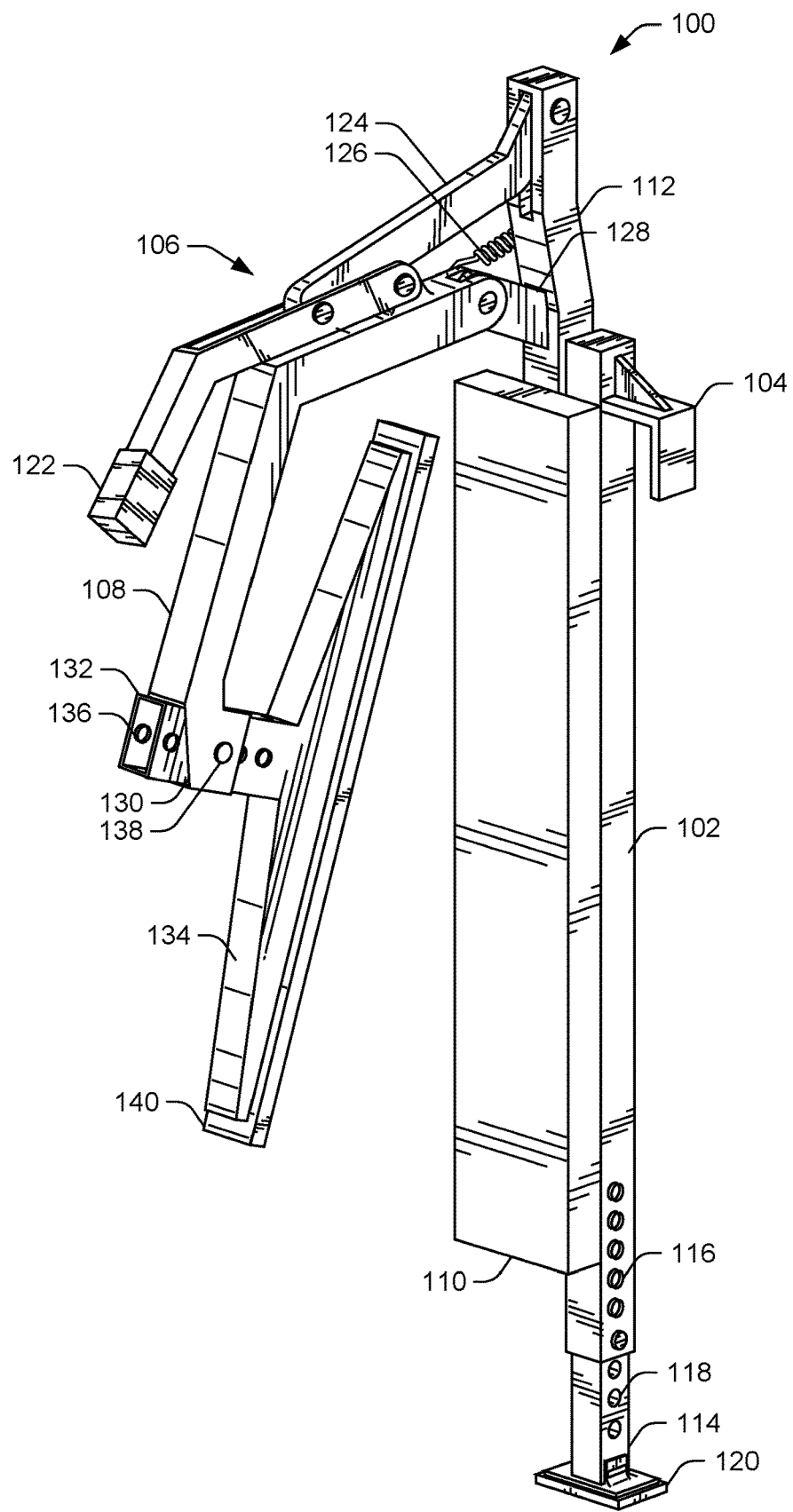
FIG. 1 is a perspective view of an example bike rack according to an embodiment of the instant application.

As mentioned above, with the varying shapes and sizes of frames and/or tires, single type bicycle carriers are not cost effective, practical, or usable between a variety of bicycles. Conventional bicycle carriers are also not convenient and easily accessible or implemented. Roof mounted carriers, for instance, often require removing the front wheel and lifting the bicycle over one's head, potentially leading to injury or damage to the vehicle. While frame attachment carriers may effectively secure the bicycle to the vehicle, the frame of the bicycle may be marred, dented, or scratched. The rigidity of the bicycle frame may also transfer potentially damaging motions from the vehicle to the bicycle. Furthermore, straps or clamps that wrap around the wheel and rim of the tire may possibly bend the rim or spokes. Conventional bike racks are also not easily removed from vehicles and often require permanent brackets or holes drilled into components of the vehicle.

In light of the above deficiencies, this application discusses a bike rack that may easily mount, secure, attach, or otherwise couple to vehicles without the need for drilling into frames, subframes, bumpers, or other structural or aesthetic components of the vehicle. A bike rack according to this application may be modifiable or adaptable to accommodate various sized and shaped bikes, various sized and shaped rims, and various sized and shaped tires. The bike rack may be easily installed and removed from vehicles and may eliminate a need to dismantle parts of the bike. The bike rack may clamp a tire of a bike, such as the front tire, and take advantage of any inherent shock-absorbing ability of the tire in order to reduce the effects of vehicle motions transferred to the bike. In an embodiment, the bike rack may be usable within a truck bed and may couple to portions of the truck bed.

In an embodiment, a bike rack may include a leg member, an attachment mechanism, one or more securing members, and a quick-release cam. The leg member may contact a floor of the truck bed. A portion of the leg member in contact with the floor may include a foot that prevents the leg member from slipping, repositioning, or moving within the truck bed. A spring may reside within the leg member to ensure that the foot remains in contact with the truck bed. In an embodiment, the foot may include rubber. The foot may also prevent the leg member from damaging the floor of the truck bed (e.g., scratching).

The leg member may telescope or adjust to various sized heights of truck beds. In an embodiment, to adjust to various sized truck beds, the leg member may include preconfigured holes or slots that dispose the bike rack at certain heights within the truck bed, or adjust features of the bike rack to accommodate differently sized truck beds. For instance, as some trucks are larger than others, and often include heightened beds, the leg member may extend to permit attachment of the bike rack to features of the truck bed. Conversely, for smaller sized trucks having smaller bed heights, the leg member may retract. As such, the bike rack may adjust to the respective bed heights of a variety of trucks. However, it is also contemplated that, in an embodiment not shown, the leg member may have predefined lengths.

The attachment mechanism may couple the bike rack to the vehicle. In an embodiment, the attachment mechanism may be disposed at an end of the leg member opposite an end at which the foot is disposed on the leg member. In combination, the foot of the leg member and the attachment mechanism may secure the bike rack to the truck bed.

To illustrate, truck beds often have sidewalls that define the truck bed. Tops of the sidewalls often include a lip, rim, border, or flange. In an embodiment, these flanges of the sidewall may include undercuts, protrusions, or other features to which a mount, strut, or bracket may engage. Given these features, in an embodiment, the attachment mechanism may engage, cusp, clutch, cinch, grip, or couple to the flange of the truck bed. For instance, the attachment mechanism may include features that engage the flange of the truck bed. In an embodiment, and by way of non-limiting examples, the attachment mechanism may have surfaces that fit under the flange, mirror a contour of the flange, and/or hold against the flange. After fitting the attachment mechanism to the flange, a fastener may couple the attachment mechanism to the leg member. The attachment mechanism may include a receptacle that receives the fastener. The fastener may include, for instance, bolts, screws, wing-nuts, knobs, levers, handles, etc. Through tightening the fastener, the attachment mechanism may clamp the truck bed and tighten the attachment mechanism to the flange. The fastener may be disposed through the leg member and by tightening the fastener, the flange of the truck bed may compress between features of the leg member and the attachment mechanism. Conversely, through untightening the fastener, the attachment mechanism may release the flange and the bike rack may be removable from the truck bed.

The attachment mechanism may include slip resistant mats or pads, such as rubber, that assist in securing the bike rack to the truck bed by preventing the attachment mechanism from disengaging with the flange. For instance, surfaces of the attachment mechanism that engage the flange may include pads. When the attachment mechanism is tightened to the leg member, for instance, the pads may compress against the flange. The pads may increase an adhesion strength between the attachment mechanism and the flange. The pads may also prevent the attachment mechanism from scratching the truck bed. In an embodiment, the pad may also be disposed on portions of the leg member that contact the flange.

In an embodiment, the attachment mechanism may secure to the leg member at different positions along a length of the leg member. For instance, the leg member may have a slot through which the fastener is disposed in order to couple the attachment mechanism to the leg member.

Through the engagement of the attachment mechanism with the flange, as discussed above, the bike rack may be secured to the truck bed without the need to drill or screw fasteners into structural features of the vehicle.

The securing members of the bike rack may secure a bike within the truck bed. In an embodiment, the securing members may transition between open and clamped states via a movement of the quick-release cam. The securing members may include supports that are brought together to secure the tire therebetween when the quick-release cam is clamped. In the open state, the securing members may be disposed farther away from each other such that the bike rack may receive a tire of the bike. In the clamped state, the securing members are brought closer together such that the securing members clamp the tire.

The securing members may clamp the tire through engaging opposing sides of the tire and may compress portions of the tire, such as the wheel. In an embodiment, one of the securing members may be configured to move while another securing member may be stationary. For instance, a stationary securing member may be disposed on a first side of the tire while a movable securing member may be disposed on a second, opposing side of the tire. The movable securing member may be brought into the clamped state via a handle of the quick-release cam, and in doing so, the tire may be secured within the securing members. That is, the movable securing member may be operably coupled to the quick-release cam such that when the quick-release cam is operated, the movable securing member secures the tire between the movable securing member and the stationary securing member. A compression force between the securing members may hold the bike in place during transport and/or storage. However, in an alternative embodiment, both of the securing members may be moveable between open and clamped states.

The securing members may include frames or braces that have pads to compress the tire. In an embodiment, the pads may deform and shape to a profile of the tire to increase a bonding strength between the pads and the tire (e.g., via an increased surface area between the pad and the tire). In other embodiments, the pad may include harder materials that compress portions of the tire. The pads may also prevent damage to the tire, such as the rim (e.g., scratching).

The securing members may contact sufficient portions of the tire to prevent the tire moving during transport. In addition, the securing members may sufficiently support the tire to prevent the tire from bending or otherwise deforming.

The quick-release cam may, in an embodiment, be a knock-over-center clamp coupled to the securing members and/or other portions of the bike rack, such as the leg member. For instance, the quick-release cam may have a handle that is pulled or pushed and through knocking the handle over a center position, the quick-release cam may lock in place unless manually manipulated in the opposite direction, thereby securing the tire between the securing members. As such, to unclamp the tire and place the securing members in the open state, the cam may move in an opposite direction to release the cam from the over-center position.

The securing members and/or the quick-release cam may adjust to accommodate various sized bikes and/or tires. For instance, road bikes often have thinner tires compared to mountain bikes or snow bikes. To be usable with a range of bikes and tire sizes, the securing members may be modifiable such that when the securing members are in the clamped state, a distance between the securing members is increased or decreased. That is, the distance between the securing members may be adjusted such that when the securing members are in the clamped state, the distance therebetween accommodates various sized tires. For instance, one or both of the securing members may adjust to preconfigured locations such that when the securing members are clamped together, the distance therebetween varies. Thus, the securing members may accommodate a road bike tire as well as a snow bike tire, which is relatively a larger sized tire than the road bike tire.

In an embodiment, the bike rack may include a locking mechanism to prevent theft of the bike from the bike rack.

Additionally, and/or alternatively, the bike rack may include components through which locks or cables may be disposed to secure the bike to the bike rack. For instance, in the clamped state, the quick-release cam may include a lock that prevents a movement of the handle and therefore, the quick-release cam from opening.

Furthermore, while the bike rack herein is discussed in use with bikes, in an embodiment, the bike rack may be usable with motorcycles, mopeds, tricycles, scooters, or other wheel-based vehicles. In addition, the bike rack may be implemented in locations of the vehicle other than a truck bed. For instance, those skilled in the art may recognize the ability to modify the vehicle attachment aspect of the disclosed device to implement a similar clamping mechanism as that disclosed herein. It is contemplated that such modifications still fall within the scope of the bike rack disclosed herein, as features of the securing members and quick-release cam may be usable in other designs or configurations on other vehicles to secure a bike. As a non-limiting example, components of the bike rack may be implemented on a roof or other cargo supports of a vehicle.

First Example Bike Rack

FIG. 1 illustrates a perspective view of an example bike rack 100 including a leg member 102, an attachment mechanism 104, a clamping mechanism 106, and an arm member 108. The leg member 102 may include a first pad 110 and a support 112. In an embodiment, the first pad 110 may couple to the leg member 102 and/or the support 112. The support 112 may couple to the leg member 102 and/or the first pad 110. The attachment mechanism 104 may be securable or couplable to the leg member 102. Discussed in more detail herein, a fastener may be disposed through the leg member 102 and into the attachment mechanism 104 such that when the fastener is tightened, the bike rack 100 is secured to a truck bed.

To accommodate various sized truck beds, the leg member 102 may include a telescoping leg 114 that protrudes from the leg member 102. The telescoping leg 114 may be disposed at an end of the leg member 102 opposite to where the attachment mechanism 104 couples to the leg member 102. The leg member 102 may have holes 116 that concentrically align with holes 118 on the telescoping leg 114. The holes 116 may linearly extend along a length of the leg member 102. The holes 118 may also linearly extend along a length of the telescoping leg 114.

Through extending or retracting the telescoping leg 114 within the leg member 102, one or more holes of the holes 116 may align with one or more holes of the holes 118. When one or more holes of the holes 116 align with one or more holes of the holes 118, a fastener may be disposed therethrough. The disposition of the fastener through the leg member 102 and the telescoping leg 114 may adjust a height of the leg member 102 or an amount the telescoping leg 114 extends from the leg member 102. In doing so, the relative height of the attachment mechanism 104 within the truck bed may adjust such that the attachment mechanism 104 may accommodate differently sized trucks. That is, the attachment mechanism 104 may be disposed at various vertical heights within the truck bed according to where the fastener is disposed through the leg member 102 and the telescoping leg 114.

Additionally, and/or alternatively, the telescoping leg 114 may have a spring-loaded pin or pull pin (not shown) that is capable of recessing into the telescoping leg 114, such that as the leg member 102 slides over the telescoping leg 114, the pin protrudes into or through one or more holes of the holes 116. When the pin is disposed within a hole of the holes 116, a height of the leg member 102 or an amount the telescoping leg 114 extends from the leg member 102 may be fixed.

The telescoping leg 114 may have a foot 120 to assist in securing the bike rack 100 to the truck bed. For instance, as discussed in more detail herein, the foot 120 may prevent the leg member 102 from repositioning along a floor of the truck bed. In an embodiment, the foot made may be made of rubber, plastic, composites, or other anti-slip material to secure the foot 120 against the floor of the truck bed.

To hold the leg member 102 or foot 120 in tension against the floor of the truck bed, in an embodiment, a spring (not shown) may be disposed within the telescoping leg 114. The tension applied by the spring may prevent the telescoping leg 114 and the foot 120 from sliding within the truck bed. In an embodiment, the spring may be disposed within the leg member 102 between an end of the telescoping leg 114 and the fastener disposed through leg member 102 and the telescoping leg 114. The spring may apply force to the telescoping leg 114 in a direction extending out of the leg member 102, so as to press against the floor of the truck bed.

With further reference to FIG. 1, the clamping mechanism 106 may couple portions of the leg member 102 to the arm member 108. In an embodiment, the clamping mechanism 106 may include a handle 122, a first linkage 124, and a spring 126. The handle 122 may couple to the arm member 108 and the first linkage 124. The spring 126 may be disposed between the arm member 108 and the support 112. The arm member 108 may also operably couple to the support 112 via a second linkage 128 extending from the support 112.

The clamping mechanism 106 is used to transition the bike rack 100 between open and clamped states. For instance, the clamping mechanism 106 may include a knock-over-center clamp that couples to portions of the leg member 102 and the arm member 108. By moving the handle 122 of the clamping mechanism 106, the arm member 108 transitions between open and clamped states. The coupling of the arm member 108 to the support 112 about the second linkage 128 may therefore permit the arm member 108 to rotate between open and clamped states. The coupling of the handle 122 with the first linkage 124 and the arm member 108 may permit the arm member 108 to rotate between open and clamped states. The first linkage 124 may also be permitted to rotate on or within the support 112 to allow the clamping mechanism 106 to move between open and clamped states. That is, while FIG. 1 illustrates the first linkage 124 attached within a slot, for instance, of the support 112, the first linkage 124 may be attached in other manners that permit the first linkage 124 to pivot to allow the clamping mechanism 106 to transition the bike rack 100 between open and clamped states. For instance, the first linkage 124 may be coupled along an outside or lateral edge of the support 112.

Movement of the arm member 108 and the clamping mechanism 106 in the embodiment of FIG. 1 is as follows. By pulling/pushing the handle 122 in an upward direction, for example, the arm member 108 moves into a clamped state as the arm member 108 pivots about a point of contact between the arm member 108 and the second linkage 128. In the clamped state, the spring 126 may prevent the clamping mechanism 106 from unintentionally opening and releasing the tire.

The clamping mechanism 106 may function has a knock over center clamp through a linkage system of levers and pivots. That is, the handle 122, the first linkage 124, the spring 126, and the second linkage 128, which are connected by pivot points, supply the action and clamping force to secure the tire. As noted above, these pivot points may be located between the arm member 108 and the second linkage 128, the support 112 and the first linkage 124, the handle 122 and the first linkage 124, and the handle 122 and the arm member 108. At these pivot points, pins may be disposed therethrough to couple the components together (e.g., the arm member 108 and the second linkage 128) and permit the components to pivot about the pin. Accordingly, the clamping mechanism 106 may have an over-center lock point, which is a fixed stop, when the handle 122 is knocked over a center position. Once in the over-center position, the clamping mechanism 106 cannot move or unlock unless the handle 122 is moved.

The arm member 108 may include a slot 130 through which a strut 132 of a brace 134 slidably extends to adjust for varying tire sizes. The strut 132 may include two or more holes 136 aligned linearly along a length of the strut 132. The slot 130 may include a hole 138 positioned within the area of the slot 130 so as to concentrically align with the two or more holes 138 in the strut 132, as the strut 132 slides within the slot 130. When the hole 138 aligns with a hole of the two or more holes 136, a fastener may be disposed therethrough to secure the brace 134, via the strut 132, to arm member 108. Through the disposition of the fastener through one of the two or more holes 136 in the strut 132, the brace 134 may be disposed at various distances from the arm member 108 to allow the bike rack 100 to accommodate various sized bikes and tires. That is, the brace 134 may extend at various lengths from the arm member 108 according to which hole is selected of the two or more holes 136.

As mentioned above, the brace 134 may include a second pad 140. In combination, the first pad 110 and the second pad 140 may secure the tire of a bike therebetween when the bike rack 100 is in the clamped state. For example, as mentioned above, when the handle 122 of the clamping mechanism 106 is pulled/pushed, the second pad 140 coupled to the arm member 108 may be brought into the clamped state such that the tire may be clamped between the first pad 110 and the second pad 140. In an embodiment, the first pad 110 may be stationary while the second pad 140 may be moveable such that second pad 140 is configured to transition between open and clamped states.

To compress and secure the tire, the first pad 110 and/or the second pad 140 may include rubber (e.g., (Ethylene Propylene Diene Monomer), foams (e.g., polyurethane or polyester), Silicone, plastics (e.g., polypropylene), or any combination thereof. The first pad 110 and/or the second pad 140 may prevent damage, such as marring or scratching, to the tire. In addition, the first pad 110 and/or the second pad 140 may deform around the tire in the clamped state to adequately compress the tire. In addition, while FIG. 1 illustrates the relative size of the first pad 110 being larger than the second pad 140, in an embodiment, the first pad 110 and the second pad 140 may be similarly, equally, or differently shaped and/or sized. A thickness of the first pad 110 may be similar or different than a thickness of the second pad 140.

Portions of the bike rack 100 may be made from composites, plastics, metals, or any combination thereof. In addition, one or more components of the bike rack 100 may be assembled together or may be integrated into or with one another.

Figure 2:
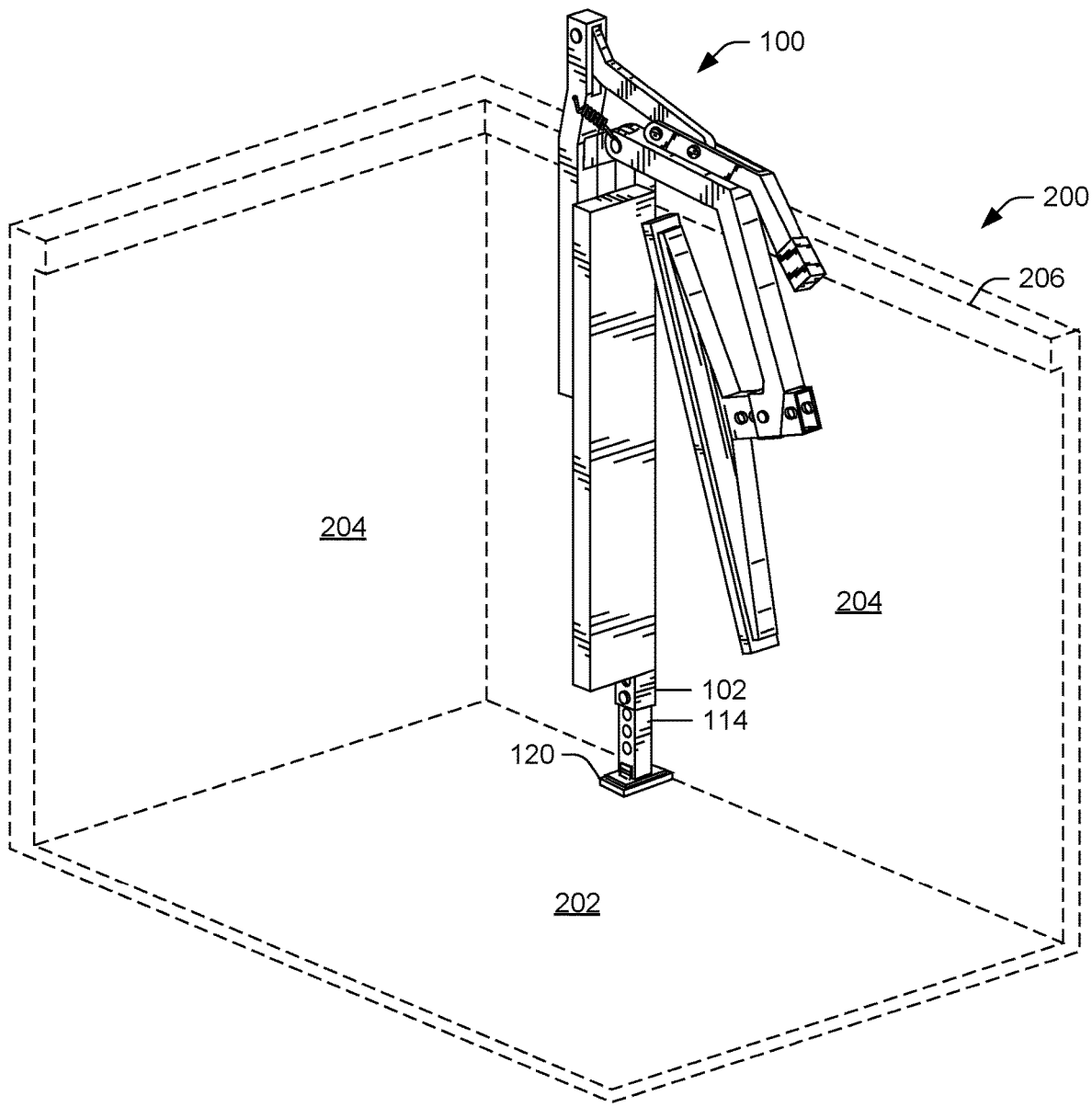
FIG. 2 is a perspective view of the example bike rack of FIG. 1, showing the example bike rack usable in a truck bed.

FIG. 2 illustrates the bike rack 100 disposed within a truck bed 200. The truck bed 200 may include a floor 202, sidewalls 204 that extend upwards from the floor 202, and a flange 206 positioned at a top of the sidewalls 204. The flange 206 may surround a perimeter of the truck bed 200 or certain sides thereof.

As shown in FIG. 2, the bike rack 100 may couple to portions of the truck bed 200. For instance, the foot 120 may rest on the floor 202 and include slip-resistant materials that prevent the bike rack 100 from repositioning within the truck bed 200. As mentioned above, in an embodiment, a spring may reside within the leg member 102 and/or the telescoping leg 114 to hold the foot 120 in tension with the floor 202. The tension applied by the spring may assist in securing the foot 120 to the floor 202.

To accommodate various sized truck beds the leg member 102 may adjust to various heights. For instance, while FIG. 2 illustrates the sidewalls 204 of a particular height, some truck beds may include sidewalls that are taller or shorter. As needed, a user may adjust the height via the telescoping leg 114, as well as the holes 116 and the holes 118 to accommodate a different height of another truck bed.

Discussed in more detail herein, the attachment mechanism 104 may couple to the flange 206 of the truck bed 200, including adjacent to the cab of the truck.

FIGS. 3A and 3B illustrate front views of the bike rack 100 positioned within the truck bed 200. Particularly, FIG. 3A shows the bike rack 100 in an open state while FIG. 3B shows the bike rack 100 in a clamped state. In the open state, the bike rack 100 may receive a tire of a bike, while in the clamped state, the bike rack 100 may secure the tire of the bike. The bike rack 100 may be secured within the truck bed 200 via the leg member 102 engaging with the floor 202 and attachment mechanism 104 coupling to portions of the sidewall 204 and/or the flange 206.

With reference to FIGS. 3A and 3B, a gap distance between the first pad 110 and the second pad 140 is greater in the open state than in the clamped state. In an embodiment, as shown in FIG. 3A, the second pad 140 may be oriented at an angle with respect to the first pad 110 in the open state. However, when the handle 122 is engaged by a user and moved into the clamped state, FIG. 3B illustrates that the second pad 240 may be oriented substantially parallel with respect to the first pad 110. In a substantially parallel orientation, the pressure applied by the first pad 110 and the second pad 140 may be evenly distributed along a length of contact with the tire. The even distribution of pressure may also reduce the risk of pressure points being imparted to the tire.

Additionally, respective adjacent ends of the first pad 110 and the second pad 140 may also be substantially parallel to one another.

Figure 4:
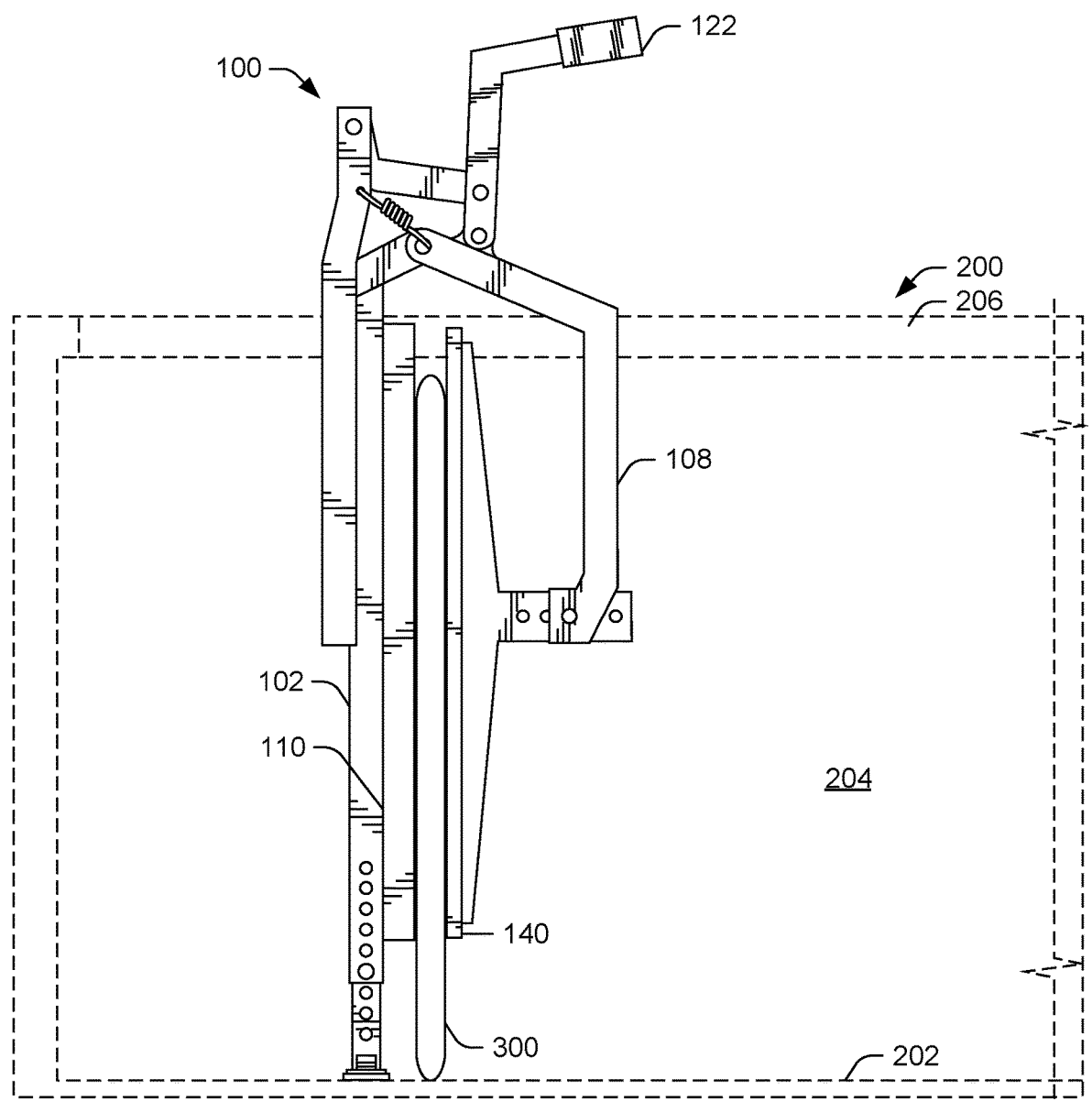
FIG. 4 is a front view of the example bike rack of FIG. 1, showing the example bike rack usable in the truck in the clamped state and securing a tire.

FIG. 4 illustrates the bike rack 100 in the clamped state. As discussed in FIGS. 3A and 3B, the bike rack 100 may receive a tire 300 of a bike in the open state and secure the tire 300 in the clamped state, as shown in FIG. 4. As depicted, the tire 300 may be disposed between and in contact with the first pad 110 and the second pad 140 on opposing sides of the tire 300, respectively, so as to secure the bike within the truck bed 200.

Figure 5A:
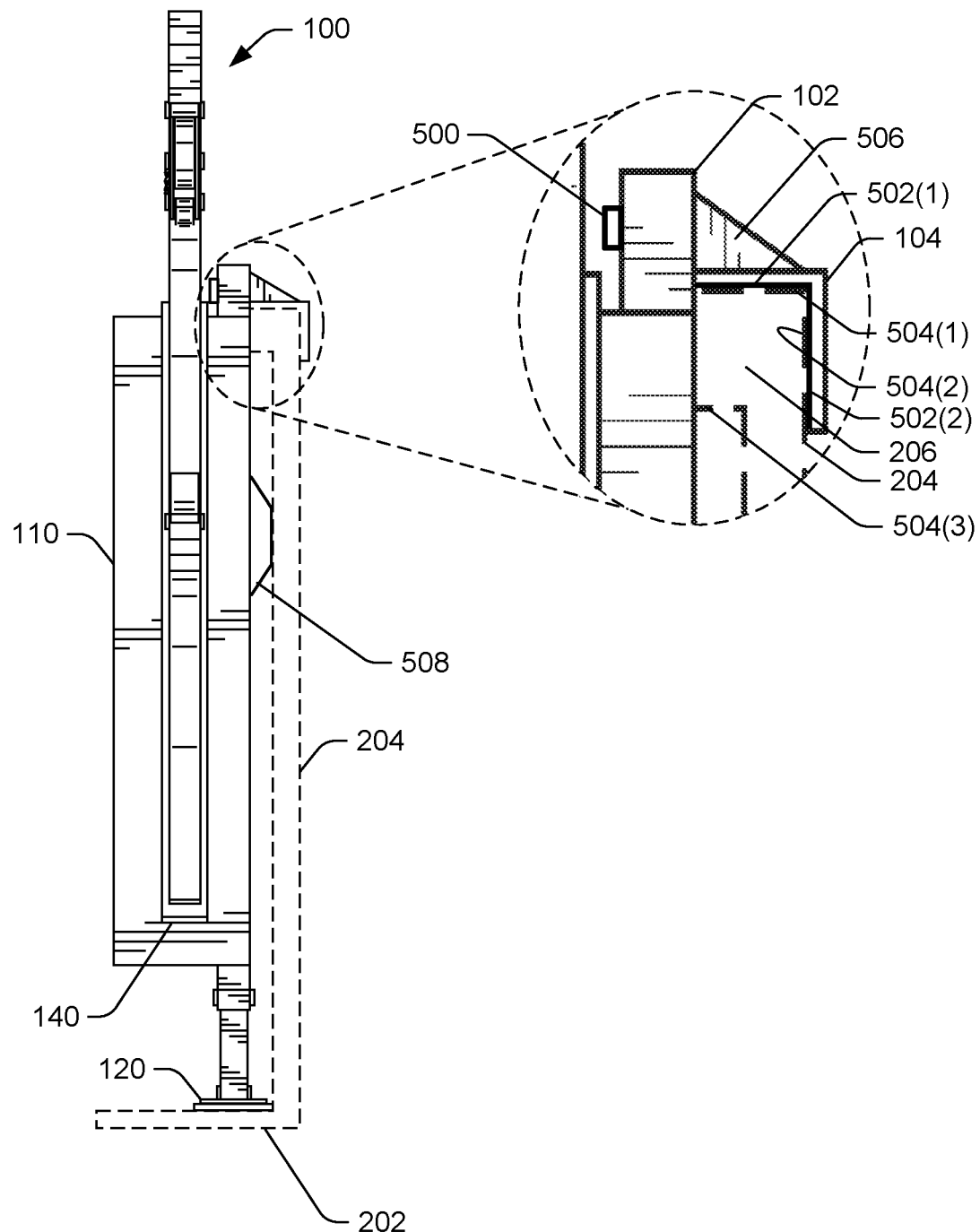
FIG. 5A is a side view of the example bike rack of FIG. 1, showing the example bike rack usable in the truck bed and in the open state.
Figure 5C:
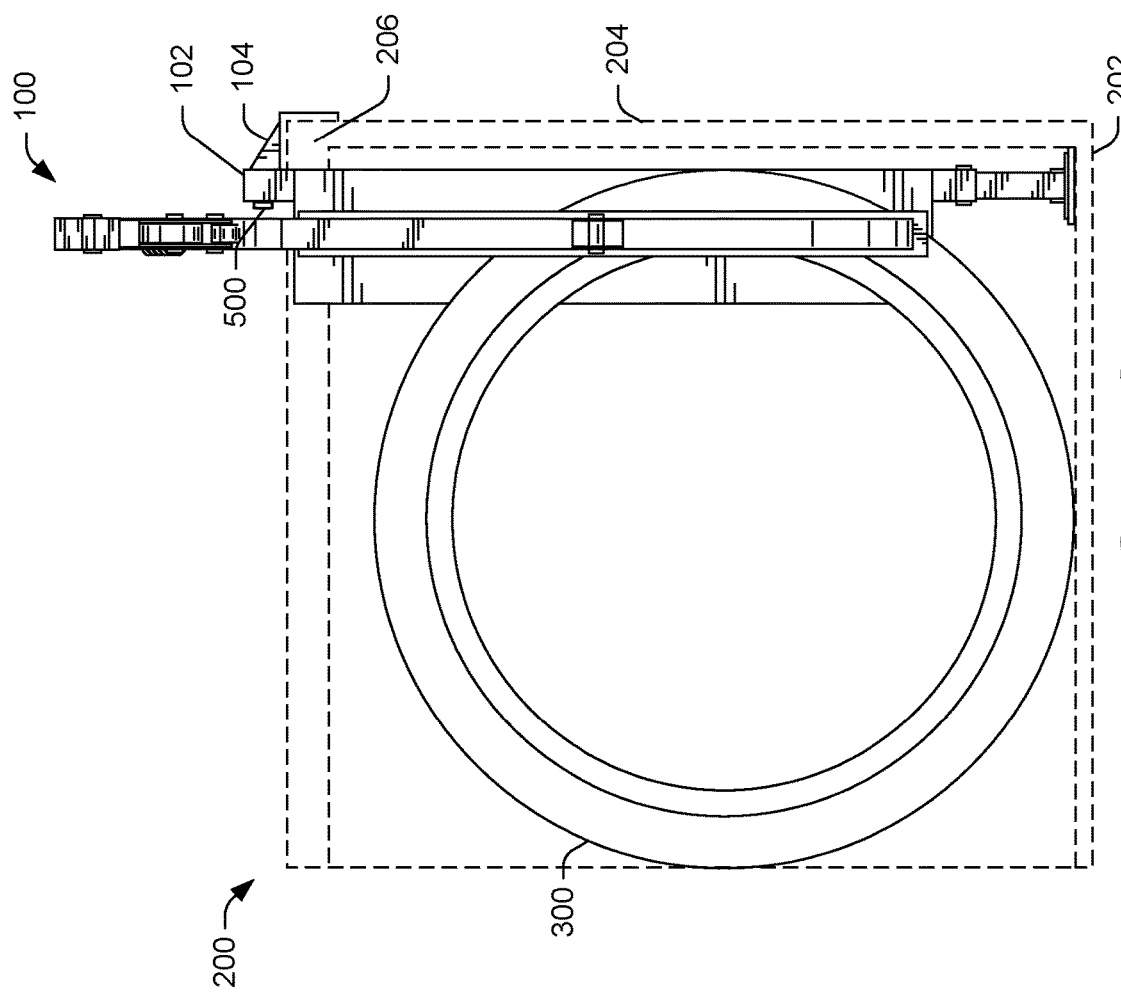
FIG. 5C is a side view of the example bike rack of FIG. 1, showing the example bike rack usable in the truck bed in the clamped state and securing a tire.
Figure 5B:
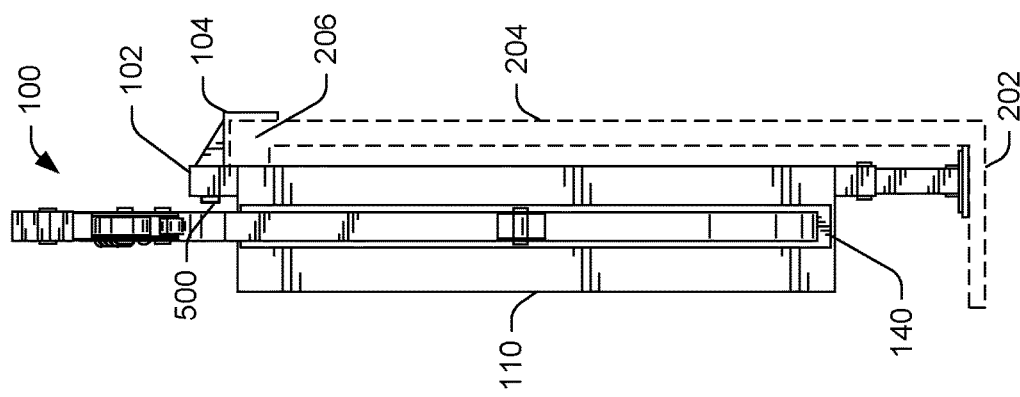
FIG. 5B is a side view of the example bike rack of FIG. 1, showing the example bike rack usable in the truck bed and in the clamped state.

FIGS. 5A, 5B, and 5C illustrate side views of the bike rack 100 within the truck bed 200. Particularly, FIG. 5A illustrates the bike rack 100 in the open state, FIG. 5B illustrates the bike rack 100 in the clamped state, and FIG. 5C illustrates the bike rack 100 in the clamped state and securing the tire 300. FIG. 5A also illustrates a close up of the coupling between the attachment mechanism 104 and the sidewalls 204 and/or the flange 206 of the truck bed 200.

Shown in FIGS. 5A, 5B, and 5C, the bike rack 100 may secure to the truck bed 200 via the attachment mechanism 104 coupling to the flange 206. In an embodiment, the attachment mechanism 104 may include a bracket that couples to the flange 206. More specifically, the attachment mechanism 104 may couple to the leg member 102 via a fastener 500 disposed through the leg member 102 and into the attachment mechanism 104. Therefore, the attachment mechanism 104 may fasten the bike rack 100 to the truck bed 200 via the attachment mechanism 104 coupling to the flange 206 via a fastening of the fastener 500. In doing so, the leg member 102 and the attachment mechanism 104 may compress portions of the sidewall 204 and/or the flange 206 therebetween. The fastener 500 may include a nut, a bolt, a screw, or other mechanical fastener capable of tightening the attachment mechanism 104 to the leg member 102.

Turning to specifics of the coupling between the bike rack 100 and the truck bed 200, the attachment mechanism 104 has a first surface 502(1) that may engage with a top 504(1) of the flange 206. The attachment mechanism 104 has a second surface 502(2) that may engage with a lateral side surface 504(2) of the flange 206 and/or portions of the sidewall 204. In an embodiment, the second surface 502(2) may extend transversely from the first surface 502(1) of the attachment mechanism 104. When the fastener 500 is fastened, for instance, into a brace 506, the second surface 502(2) of the attachment mechanism 104 may come into contact with the lateral surface 504(2) of the flange 206 and/or portions of the sidewall 204. Through a fastening of the fastener 500, the second surface 502(2) of the attachment mechanism 104 may engage the lateral surface 504(2) of the flange 206 and/or portions of the sidewall 204 to couple the bike rack 100 to the truck bed 200. Portions of the flange 206 and/or the sidewall 204 may contact the leg member 102. The flange 206 may therefore compress between portions of the attachment mechanism 104, such as the second surface 502(2), and the leg member 102. That is, via a compressive force applied between the leg member 102 and attachment mechanism 104 to the flange 206 and/or the sidewall 104, the bike rack 100 may securely couple to the truck bed 200.

Additionally, and/or alternatively, portions of the first pad 110 may contact portions of the sidewall 204 and/or portions of the flange 206 to further secure the bike rack 100 to the truck bed 200. However, in an embodiment, the first pad 110 may be offset from the sidewall 204 and/or the flange 206.

Although FIGS. 5A, 5B, and 5C illustrate the attachment mechanism 104 coupling to portions of the sidewall 204 and/or the flange 206 in a particular manner, or portions of the sidewall 204 and/or the flange 206 including certain surfaces to which the attachment mechanism 104 couples, the attachment mechanism 104 may include other features. For instance, other truck beds may include similar or differently shaped sidewalls or flanges than that illustrated herein. To accommodate varying truck bed designs, the attachment mechanism 104 may include additional sides or surfaces, or differently shaped features, that engage with the truck bed. For instance, the attachment mechanism 104 may have a third surface that extends transversely from the second surface 502(2) such that the third surface is disposed in the same direction as at least a portion of the first surface 502(1) of the attachment mechanism 104, resembling a "U" shape. The third surface may, in an embodiment, engage with additional flanges or portions of the sidewall 204.

Additionally, and/or alternatively, other surfaces may extend from the first surface 502(1) and/or the second surface 502(2) in additional manners. For example, an additional surface may extend from the first surface 502(1) and engage with a bottom surface 504(3) of the flange 206. The engagement of the attachment mechanism 104 with the bottom surface 504(3) of the flange 206 may assist in preventing the bike rack 100 from disengaging with the truck bed 200 during an upward movement experienced by the vehicle.

In an embodiment, the attachment mechanism 104 may include mats or other substrates that mate with the flange 206 to increase a coupling strength between the attachment mechanism 104, the flange 206, and/or portions of the sidewall 204. For instance, the first surface 502(1) and/or the second surface 502(2) may include rubber substrates (not shown) that abut the flange 206. When the fastener 500 is fastened to the attachment mechanism 104, the rubber may compress against the flange 206 and increase a coupling between the attachment mechanism 104 and the flange 206.

Through the coupling of attachment mechanism 104 with the truck bed 200 (e.g., with the floor 202, the sidewalls 204, and/or the flange 206), the bike rack 100 may eliminate drilling or screwing fasteners into or through the truck bed 200 and/or other subcomponents of the vehicle. Therefore, the coupling force between the attachment mechanism 104 and the truck bed 200 may prevent the bike rack 100 from disengaging with the truck bed 200 during transport.

Shown in FIG. 5A, but not in the other figures, in an embodiment the bike rack 100 may further include a bumper 508. The bumper 508 may couple to portions of the leg member 102 and/or the first pad 110 using a fastener (e.g., double-sided tape, adhesive, screw, magnet, etc.). The bumper 508 may extend from the bike rack 100, for example from the leg member 102, and contact or rest proximate to a portion of the truck bed 200, such as the sidewalls 204 and/or the flange 206. For example, shown in FIG. 5A, the bumper 508 may contact the sidewall 204. Contact between the bumper 508 and the sidewalls 204, for example, may further secure the bike rack 100 to the truck bed 200. Additionally, in an embodiment, the bumper 508 may be adjustable along a length of the leg member 102. For example, portions of the bumper 508 may contact the bottom surface 504(3) of the flange 206. Furthermore, portions of the bumper 508 in contact with the bottom surface 504(3) may mirror a contour of the flange 206 (e.g., the bottom surface 504(3)), such as being square and/or curved.

FIGS. 5A, 5B, and 5C also illustrate that the first pad 110 may be sized larger than the second pad 140. However, as noted above, the first pad 110 may have a width that is larger, smaller, equal to, or substantially equal to a width of the second pad 140. In the clamped state, the first pad 110 and/or the second pad 140 may contact opposing sides of the tire 300 and prevent the tire 300 from buckling or twisting within the bike rack 100. While FIG. 5C illustrates the first pad 110 and the second pad 140 contacting a certain area or portion(s) of the tire 300, the first pad 110 and/or the second pad 140 may contact more or less of the tire 300 than shown. In an embodiment, however, the first pad 110 and/or the second pad 140 may contact opposing halves on a side of the tire 300.

Figure 6A:
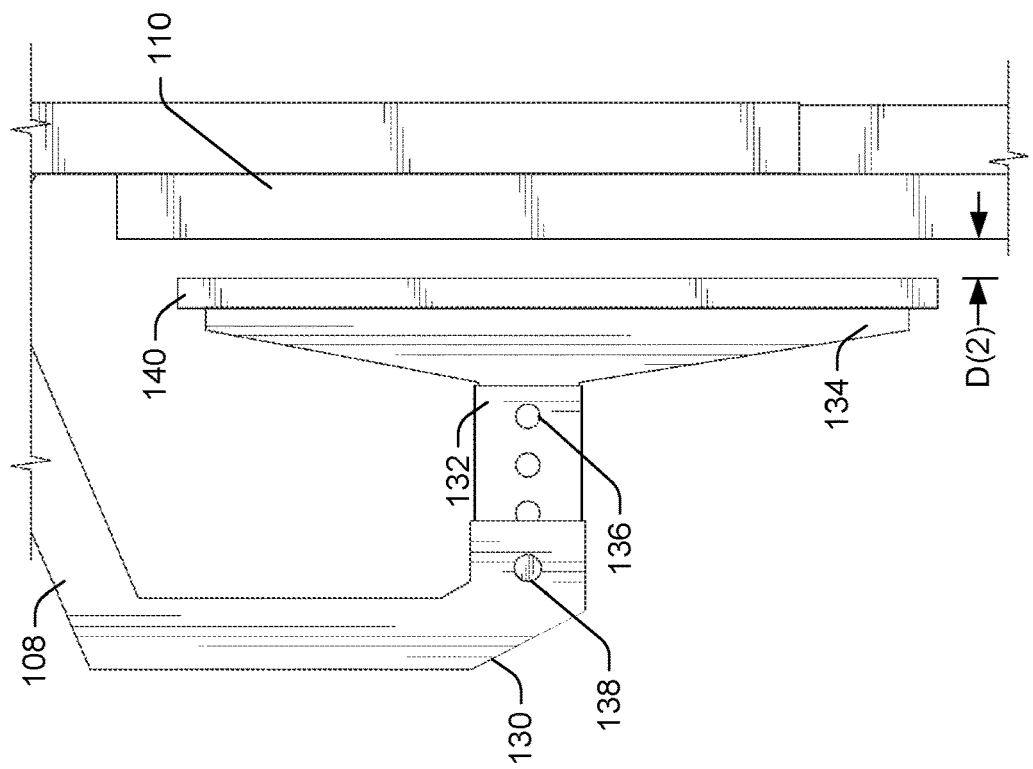
FIG. 6A is a front view of an extendable arm of the example bike rack of FIG. 1, showing the extendable arm in a first position.
Figure 6B:
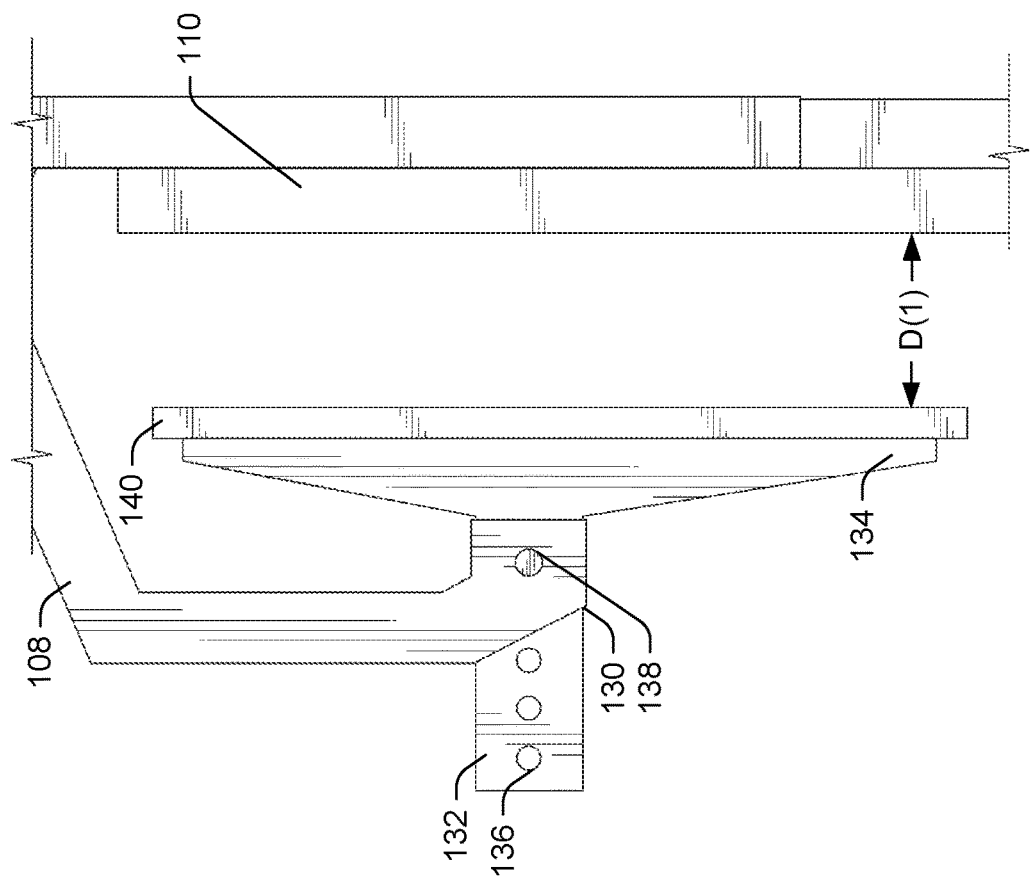
FIG. 6B is a front view of an extendable arm of the example bike rack of FIG. 1, showing the extendable arm in a second position.

FIGS. 6A and 6B illustrate the bike rack 100 in the clamped state and being configurable to accommodate varying sizes of bike and/or bike tires. As mentioned above, the arm member 108 may have the slot 130 extending therethrough and through which the strut 132 of the brace 134 is disposed. The slot 130 may have the hole 138. The strut 132 may have the two or more holes 136 and by aligning a hole of the two or more holes 136 with the hole 138, a distance the strut 132 is disposed through the slot 130 may be adjusted. The distance at which the brace 134 and the second pad 140 are disposed may be adjusted according to the positioning of the strut 132 within the slot 130. A fastener, such as a pin or bolt, may be disposed through the hole 138 and the two or more holes 136 to secure the strut 132 within slot 130. In doing so, the bike rack 100 may adjust to varying tire sizes.

FIG. 6A shows that a first hole of the two or more holes 136 may align with the hole 138 and that the brace 134 may minimally extend from the arm member 108 or that the strut 132 may minimally extend out of the slot 130. In turn, in the clamped state, a distance D(1) may be disposed between the first pad 110 and the second pad 140. Comparatively, FIG. 6B shows that a last hole of the two or more holes 136 may align with the hole 138 and that the strut 132 may fully extend from the arm member 108 or out of the slot 130. In doing so, the brace 134 and the second pad 140 may extend further from the arm member 108 as compared to FIG. 6A. In the clamped state, a distance D(2) may be disposed between the first pad 110 and the second pad 140. Accordingly, in an embodiment, the distance D(1) shown in FIG. 6A may be usable with bikes having larger sized tires, such as a snow bike, while the distance D(2) shown in FIG. 6B may be usable with bikes having smaller sized tires, such as a road bike.

However, while FIGS. 6A and 6B illustrate using a particular hole of the two or more holes 136, other holes of the two or more holes 136 may be used to adjust a distance between the first pad 110 and the second pad 140 in the clamped state.

Figure 7:
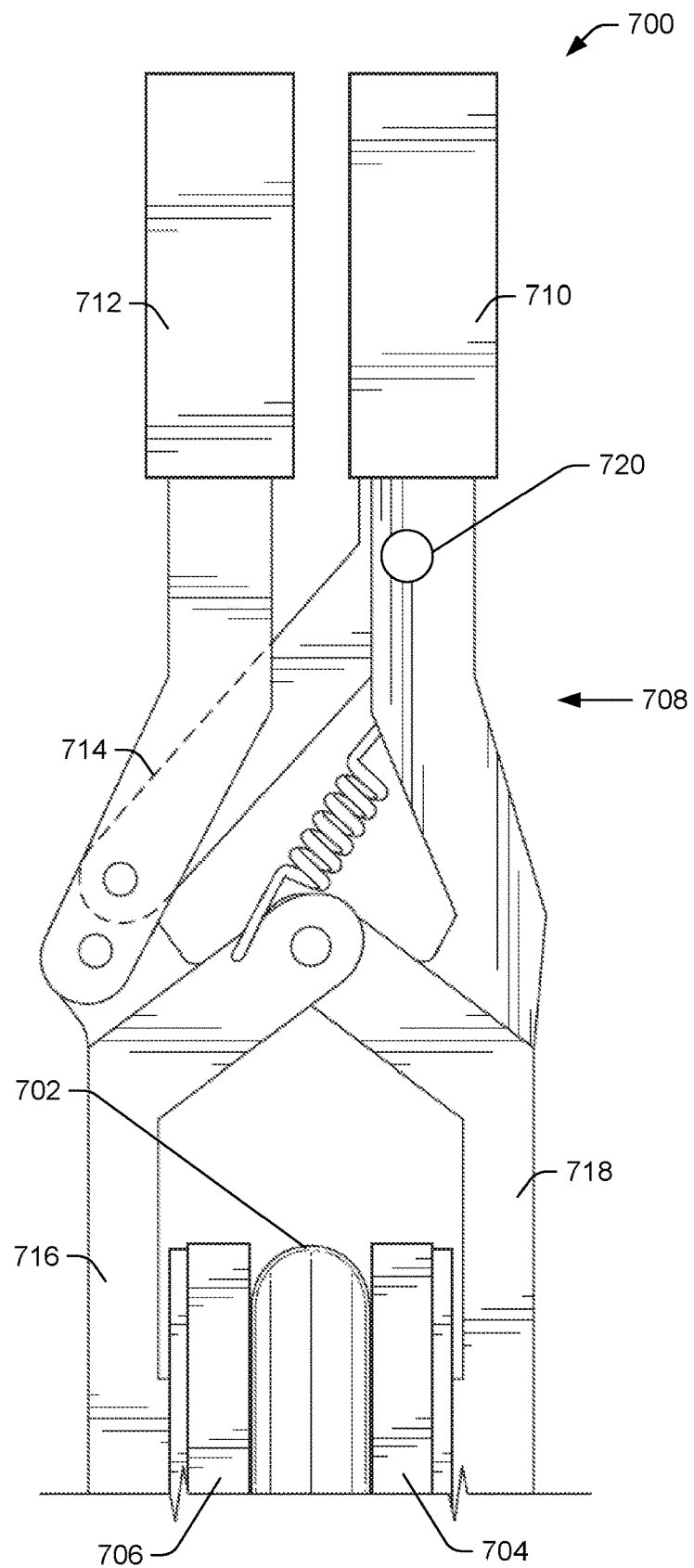
FIG. 7 is a partial front view of another embodiment of a clamping mechanism for a bike rack according to the instant application, showing a clamped state securing a tire.
Figure 8:
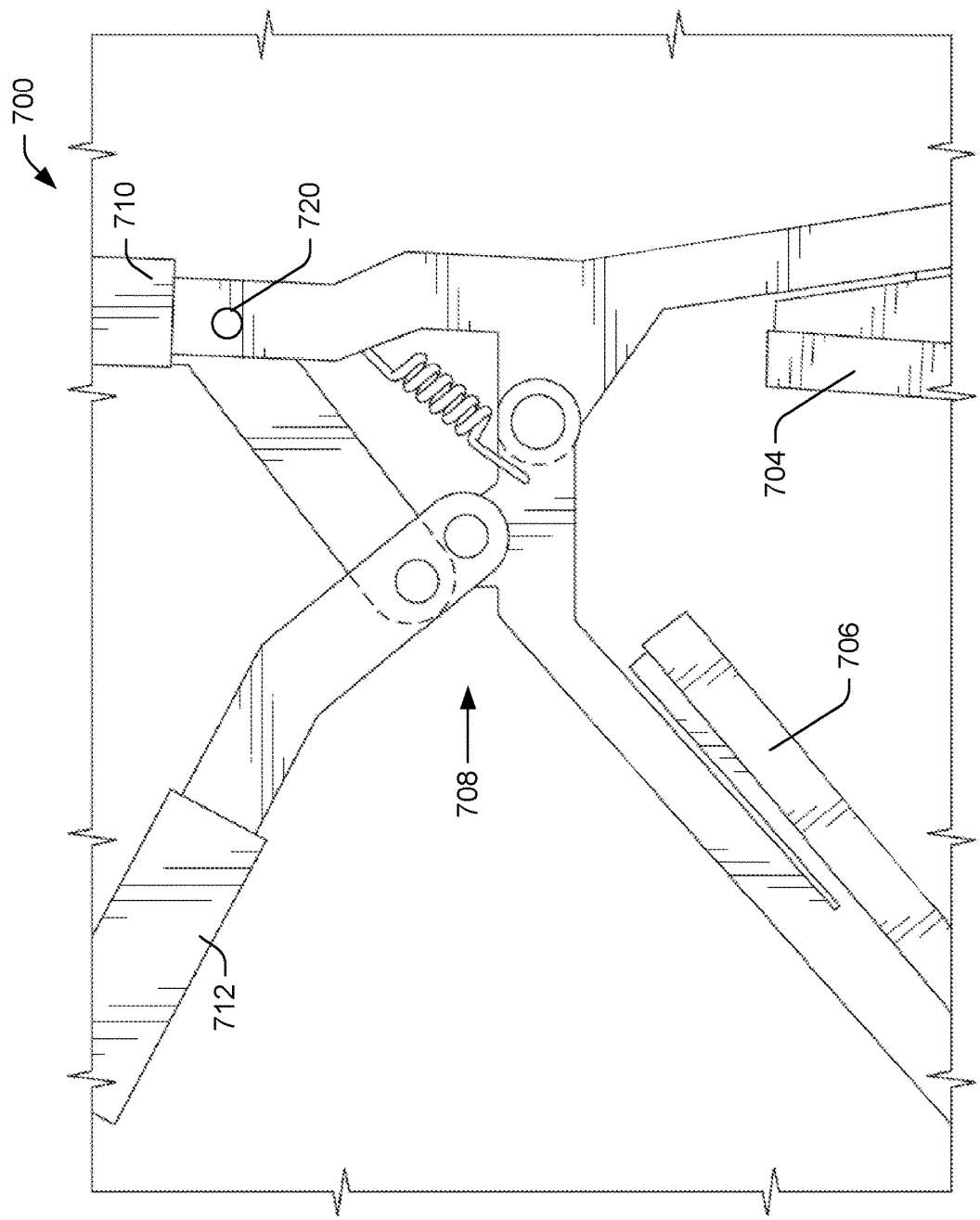
FIG. 8 is a partial front view of the other embodiment of the clamping mechanism for the bike rack of FIG. 7 according to the instant application, showing an open state.

FIGS. 7 and 8 illustrate a bike rack 700 usable to secure a tire 702 within a truck bed through a first pad 704 and a second pad 706 contacting opposing sides of a tire 702. Particularly, FIG. 7 illustrates the bike rack 700 in a clamped state while FIG. 8 illustrates the bike rack 700 in an open state. In an embodiment, similar to the bike rack 100, the bike rack 700 may have an attachment mechanism to secure the bike rack 700 to a truck bed. However, in an embodiment, FIGS. 7 and 8 illustrate that the bike rack 700 may include a clamping mechanism 708 to transition the bike rack 700 between open and clamped states.

The clamping mechanism 708 may function as a knock-over-center clamp to secure the tire 702 in the clamped state. The clamping mechanism 708 may have a first handle 710 and a second handle 712. In the clamped state and as shown in FIG. 7, the first handle 710 and the second handle 712 may be brought together to secure the tire 702. The first handle 710 may be stationary while the second handle 712 may be moveable between the open and clamped state. The second handle 712 may operably couple to a linkage 714 and an arm member 716. The arm member 716 may also operably couple to a leg member 718 to permit the arm member 716 to pivot into the clamped state. In an embodiment, the leg member 718 may be similar to the leg member 102, as discussed hereinabove.

The second pad 706 may attach to the arm member 716 and may be configured to move with the arm member 716. Similar to the bike rack 100 and the arm member 108, the coupling of the second handle 712 to the linkage 714 and the arm member 716 may cause the second pad 706 to clamp the tire 702 between the first pad 704 and the second pad 706 when the second handle 712 moves into the clamped state.

The bike rack 700 may also include a padlock hole 720 extending through portions of the clamping mechanism 708, the first handle 710, the linkage 714, and/or other components of the bike rack 700. The padlock hole 720 may be sized to accommodate a locking mechanism (e.g., lock, cable, etc.). For example, in the clamped position, a lock (not shown) may extend through the padlock hole 720. The lock may therefore prevent the bike rack 700 from transitioning to the open state. That is, in the clamped state, the lock disposed through the padlock hole 720 prevents the first handle 710 and the second handle 712 from separating and transitioning the bike rack 700 to the open state.

Figure 9:
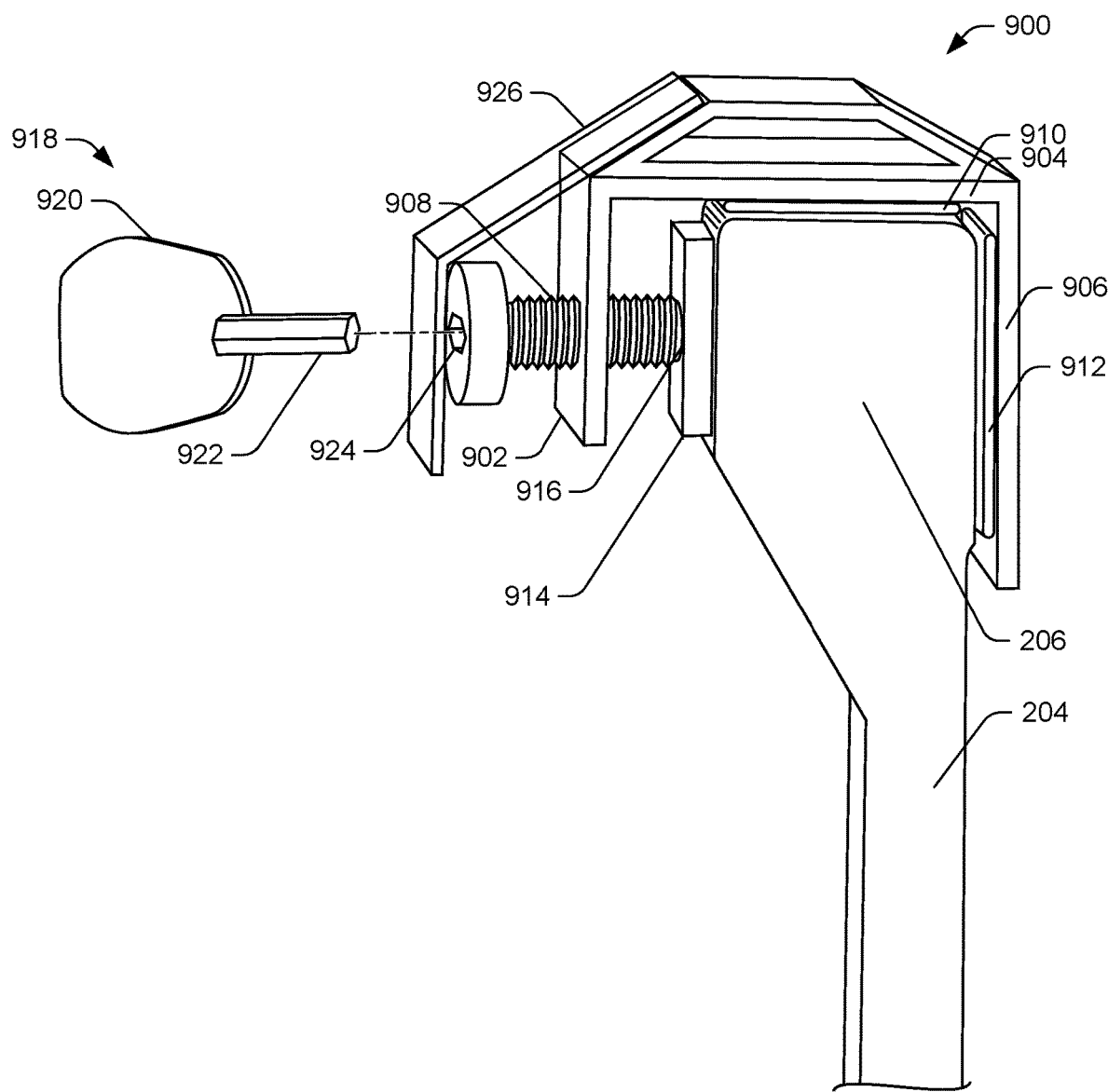
FIG. 9 is a side view of another embodiment of an attachment mechanism for a bike rack according to the instant application.
Figure 10:
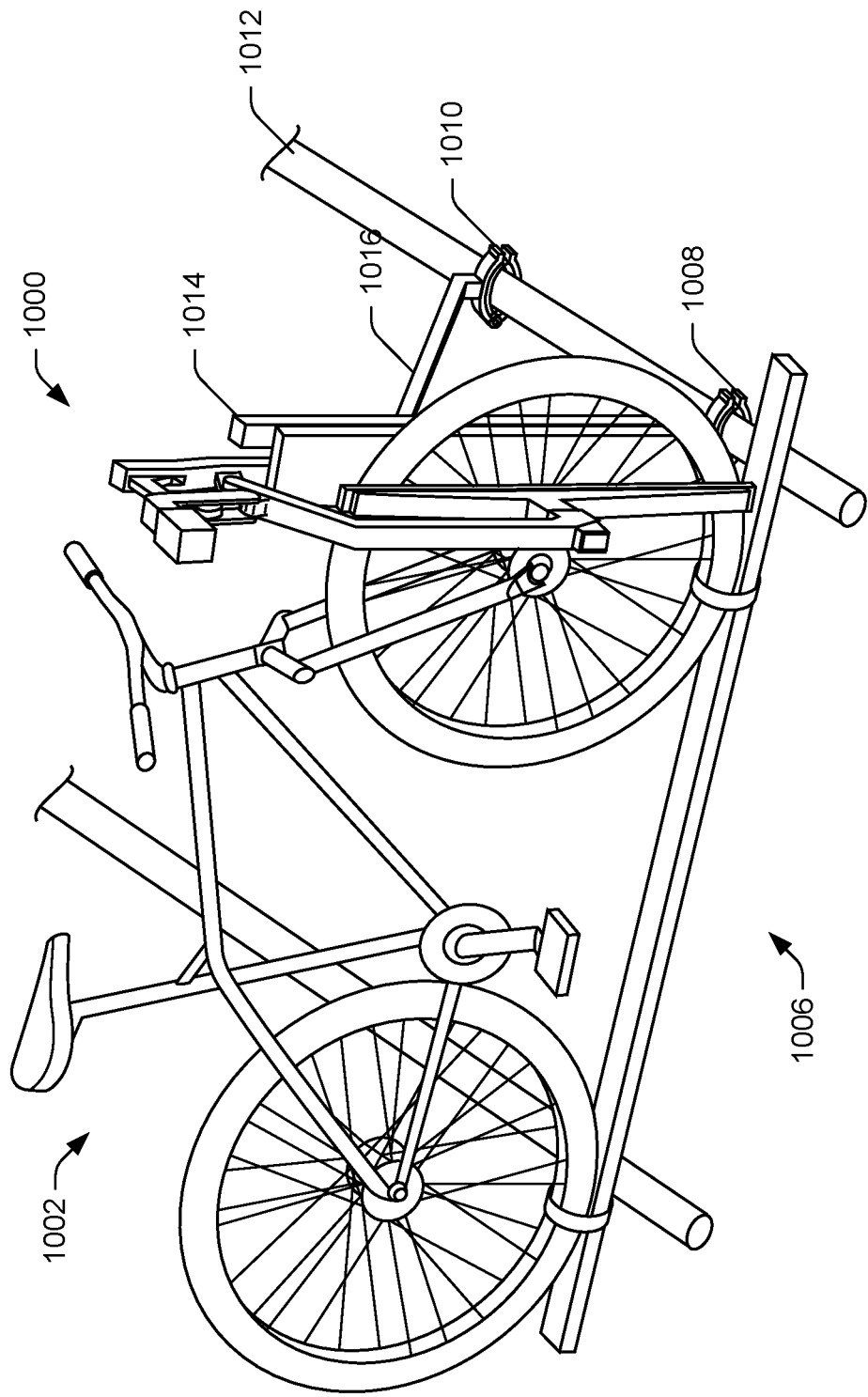
FIG. 10 is a perspective view of another example bike rack according to an embodiment of the instant application.
Figure 11:
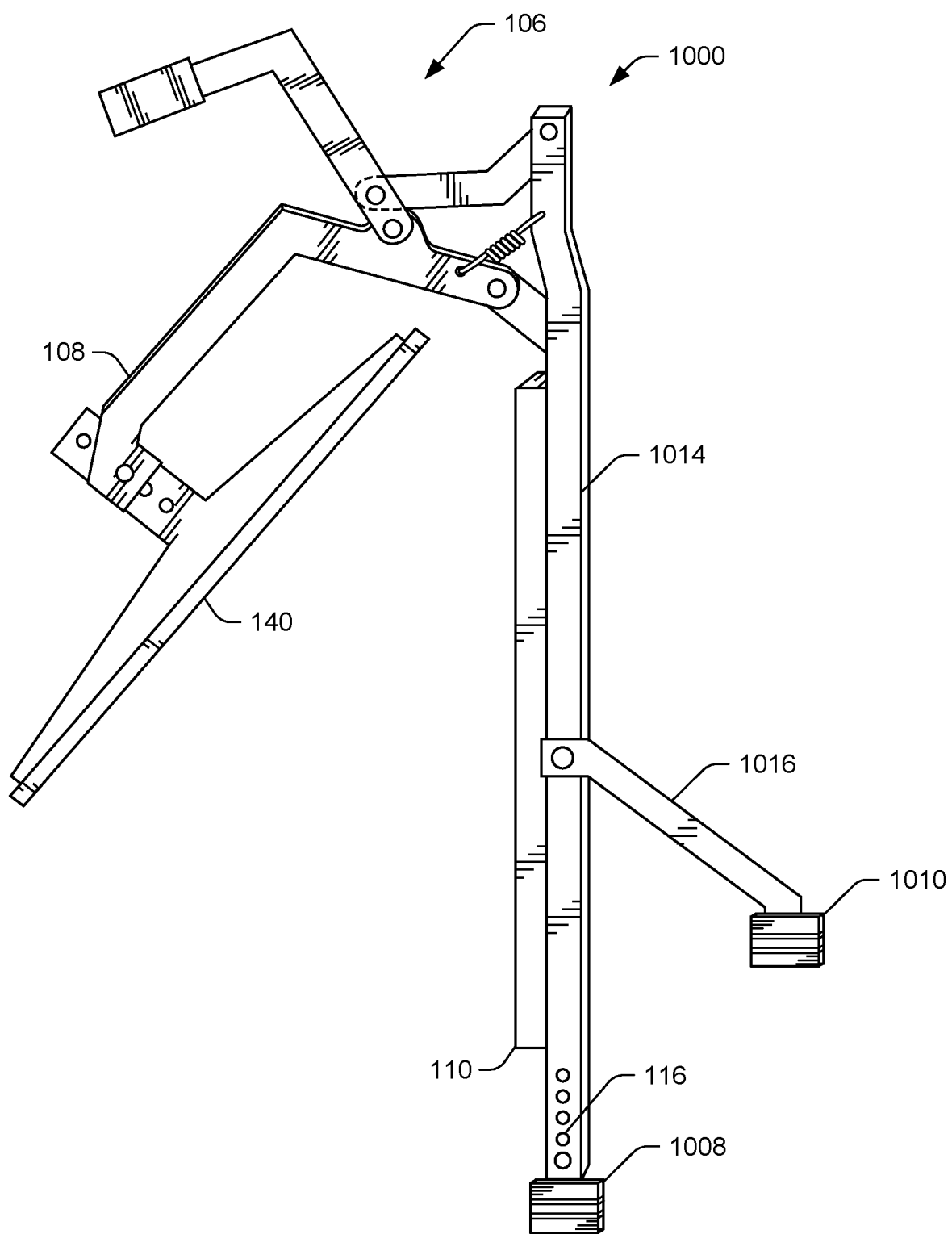
FIG. 11 is a front view of the example bike rack of FIG. 10.

FIG. 9 illustrates an attachment mechanism 900 usable to secure a bike rack to a truck bed. In an embodiment, the attachment mechanism 900 may couple to the leg member 102 or the support 112 of the bike rack 100 illustrated hereinabove. Along these lines, FIG. 9 illustrates an alternative attachment mechanism, as compared to the attachment mechanism 104, usable to secure the bike rack 100 to the truck bed 200.

The attachment mechanism 900 may have a U-shaped bracket body including a first arm 902, a second arm 904, and a connecting arm 906 that connects the first arm 902 and the second arm 904. The attachment mechanism 900 couples to the truck bed 200 using a fastener 908 extending though the first arm 902 of the attachment mechanism 900 to abut against an inside of the flange 206. More particularly, as depicted, the connecting arm 906 is placed to rest above the flange 206, while the second arm 906 rests along an outside of the flange 206 so that the first arm 902 faces the inside of the flange 206. When the fastener 908 is turned, the second arm 904 of the attachment mechanism 900 compresses against the outside of the flange 206. The connecting arm 906 of the attachment mechanism 900 may also compress against the flange 206. While described here as attaching to the back of the truck bed 200, it is contemplated that the attachment mechanism 900 may couple to additional portions of the truck bed 200, such as the sidewalls 204.

In an embodiment, a first pad 910 and a second pad 912 may be disposed on the second arm 904 and the connecting arm 906, respectively. The first pad 910 and the second pad 912 may prevent damage to the truck bed 200, such as the flange 206, or may increase a coupling force between attachment mechanism 900 and the flange 206. Additionally, in an embodiment, a spacer 914 may be interposed between an end 916 of the fastener 908 and the flange 206. The spacer 914 may prevent the fastener 908 from damaging the flange 206 (e.g., increasing a surface area between the end 916 of the fastener 908 and the flange 206) and/or may further increase a coupling force between the attachment mechanism 900 and the flange 206.

FIG. 9 further illustrates a key 918 usable with the fastener 908. The key 918 includes a handle 920 and a tip 922. The tip 922 corresponds to a profile (e.g., outline, shape, etc.) of a receptacle 924 on the fastener 908. The tip 922 therefore engages with the receptacle 924 to fasten the fastener 908. Collectively, the profile of the tip 922 and the receptacle 924 may serve as a locking mechanism to prevent unauthorized removal of a bike rack from the truck bed 200.

In an embodiment, the attachment mechanism 900 may include a flap 926 configurable to be disposed over portions of the fastener 908. For example, the flap 926 may rotate on the attachment mechanism 900 to expose to the fastener 908 and the receptacle 924. Thereafter, the flap 926 may rotate to conceal the receptacle 924.

Second Example Bike Rack

FIGS. 10-14 illustrate an example bike rack 1000 usable to secure a bicycle 1002. In an embodiment, the bike rack 1000 may include similar components as the bike rack 100, such as, without limitation, the clamping mechanism 106, the arm member 108, the first pad 110, the second pad 140, and so forth. However, FIGS. 10-14 illustrate the bike rack 1000 being securable to other portions of a vehicle, such as a cargo rack 1004 mounted to a rooftop of a vehicle.

The bike rack 1000 includes a first attachment mechanism 1006 and a second attachment mechanism 1008 operable to couple the bike rack 1000 to the cargo rack 1004. In an embodiment, the first attachment mechanism 1006 and the second attachment mechanism 1008 clamp to a bar 1010 of the cargo rack 1004. For example, the first attachment mechanism 1006 may couple to a leg member 1012 of the bike rack 1000. The second attachment mechanism 1008 may also couple to the leg member 1012 via a bar member 1014 that prevents the bike rack 1000 from rotating about the bar 1010. That is, shown in FIG. 11, the bar member 1014 may extend the second attachment mechanism 1008 radially outward from the leg member 1012 to stabilize the bike rack 1000 on the cargo rack 1004. The bar member 1014 may couple to the leg member 1012 at any position and may support bike rack 1000 from rotating or otherwise repositioning about the bar 1010.

Figure 12:
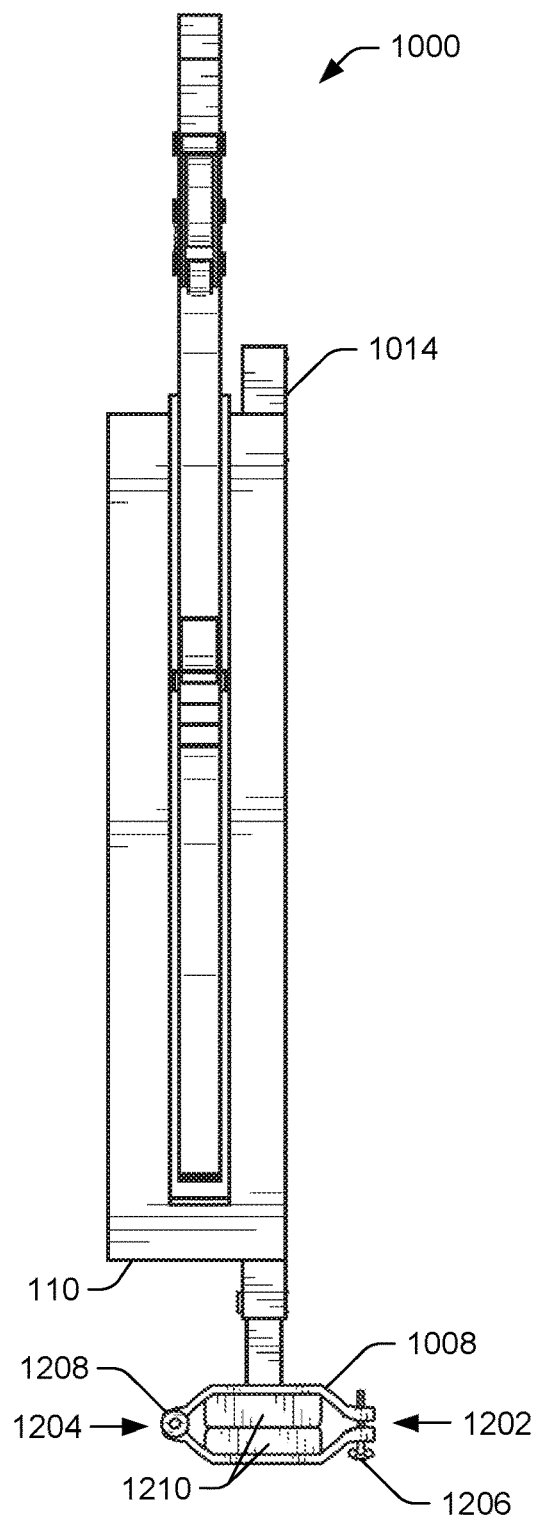
FIG. 12 is a side view of the example bike rack of FIG. 10.
Figure 13:
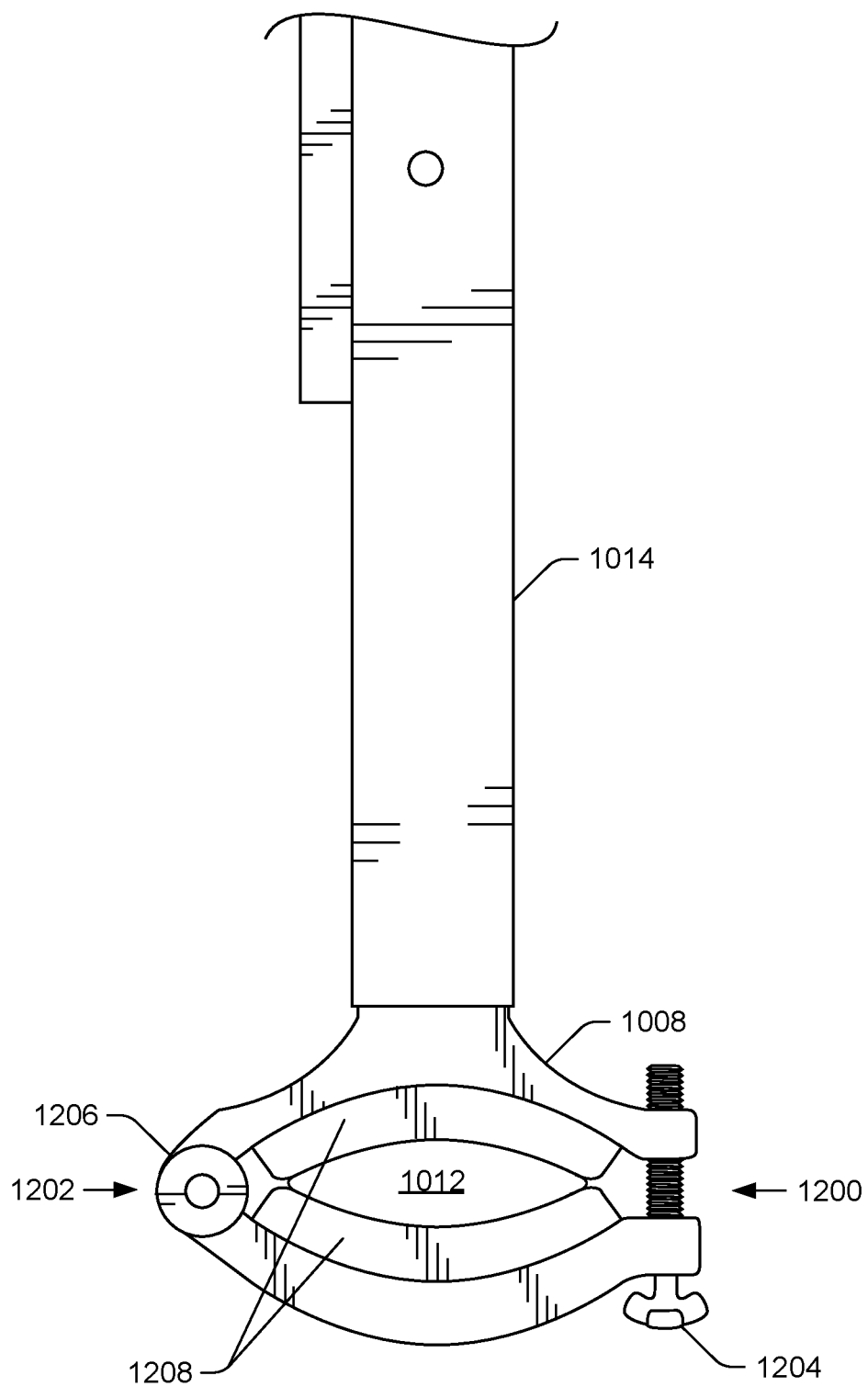
FIG. 13 is a partial side view of the example bike rack of FIG. 10.

To illustrate the coupling of the bike rack 1000 to the cargo rack 1004, shown in FIGS. 12 and 13, the first attachment mechanism 1006 may include a first end 1200 and a second end 1202. The first end 1200 may include a fastener 1204, which, when not disposed through the first end 1200, permits the first attachment mechanism 1006 to open via a pivot 1206 at the second end 1202. The first end 1200 of the first attachment mechanism 1006 may therefore slide over the bar 1010 and thereafter, the fastener 1204 may be fastened to clamp the first attachment mechanism 1006 to the bar 1010. Additionally, to increase a coupling force between the first attachment mechanism 1006 and the bar 1010, pads 1208 may be disposed on an interior of the first attachment mechanism 1006. The pads 1208 may include a compressible and anti-slip material that contact the bar 1010 when the bike rack 1000 is coupled to the bar 1010. For example, shown in FIG. 13, the pads 1208 compress around the bar 1010.

Furthermore, similar to the bike rack 100, the leg member 1012 may include the holes 116, and a fastener disposed through one of the holes 116, that allow the leg member 1012 to be adjusted at various heights.

Figure 14:
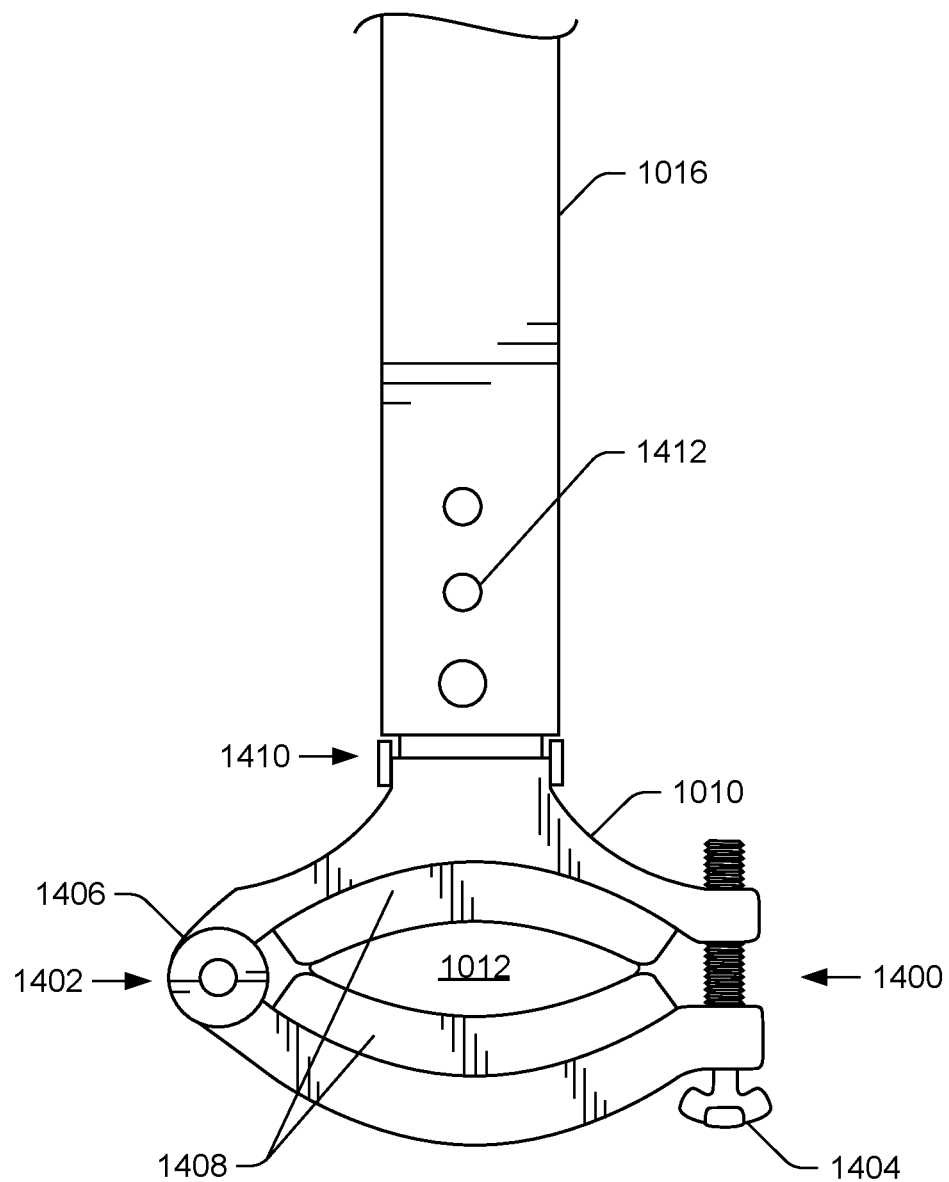
FIG. 14 is a partial side view of the example bike rack of FIG. 10.

Shown in FIG. 14, the second attachment mechanism 1008 may include similar features as the first attachment mechanism 1006, such as a first end 1400, a second end 1402, a fastener 1404, a pivot 1406, and pads 1408. However, in an embodiment, the second attachment mechanism 1008 may be rotatably coupled to the bar member 1014 via a hinge 1410. The hinge 1410 may permit the second attachment mechanism 1008 to be disposed at various positions (e.g., angle and length) from the leg member 1012. That is, the hinge 1410 permits the second attachment mechanism 1008 to be disposed at various positions along the bar 1010 relative to the leg member 1012. To permit such, the bar member 1016 may include holes 1412. A fastener 1414 may be disposed through at least one hole of the holes 1412 to extend the second attachment mechanism 1008 at various lengths from the bar member 1014.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A bike rack comprising:
   an adjustable leg member including a first leg member and a second leg member at least partially disposed within the first leg member, the second leg member being configured to extend at varying lengths from the first leg member;
   a first pad coupled to the first leg member;
   a bracket coupled to the first leg member;
   a support member coupled to at least one of the first leg member or the first pad;
   an arm member operably coupled to the support member, the arm member having a second pad;
   a linkage operably coupled to the support member; and
   a handle operably coupled to the arm member and the linkage, the handle being configured to transition the arm member between an open state and a clamped state,
   wherein, in the clamped state when a bicycle is secured, a tire of the bicycle is secured between the first leg member and the arm member.

2. The bike rack of claim 1, wherein the second leg member includes a rubber foot.

3. The bike rack of claim 1, further comprising a spring coupled to the support member and the arm member.

4. The bike rack of claim 1, wherein the first leg member includes a first plurality of holes linearly aligned along a length of the first leg member;
   wherein the second leg member includes a second plurality of holes linearly aligned along a length of the second leg member; and
   wherein at least one hole of the first plurality of holes and at least one hole of the second plurality of holes concentrically align at preconfigured positions to extend the second leg member at varying lengths from the first leg member.

5. The bike rack of claim 1, wherein the first leg member includes plurality of holes linearly aligned along a length of the first leg member;
   wherein the second leg member includes a pin; and
   wherein the pin is configured to extend through at least one hole of the plurality of hole s to lock the second leg member at varying lengths from the first leg member.

6. The bike rack of claim 1, wherein the extendable member is configured to couple to the arm member at various positions to extend at varying lengths from the arm member, and
   wherein, in the clamped state, a distance between the first pad and the second pad is based on a position at which the extendable member couples to the extendable member.

7. A system comprising:
   a first support including:
      a leg member,
      a bracket operably coupled to the leg member,
      a first pad coupled to the leg member, and
      a support member coupled to at least one of the leg member or the first pad;
   a second support including:
      an arm member rotatably coupled to the support member,
      an extendable strut coupled to the arm member,
      a brace coupled to the extendable strut, and
      a second pad coupled to the brace; and a handle operably coupled to the first support and the second support, the handle being configured to move the second support between a clamped state and an open state, wherein, in the clamped state when a bicycle is secured, a tire of the bicycle is secured between the first leg member and the arm member.

8. The system of claim 7, wherein the arm member has a slot within which the extendable strut is slidable;

wherein the slot has a hole through a sidewall thereof, wherein the extendable strut has plurality of holes linearly disposed along a length of the extendable strut; and wherein the plurality of holes are oriented to align with the hole in the slot upon sliding the extendable strut within the slot.

9. The system of claim 8, wherein the extendable strut is coupled to the arm member via a pin disposed through the hole in the slot and at least one hole of the plurality of holes on the extendable strut.

10. The system of claim 7, wherein, in the clamped state, the second pad is configured to be spaced apart from the first pad between one and five inches.

11. The system of claim 7, wherein, in the clamped state, the first pad and the second pad are substantially parallel.

12. The system of claim 7, wherein the first pad and the second pad include rubber.

13. The system of claim 7, wherein the first pad has a width and a length that is larger than a width and a length of the second pad.

14. A bike rack comprising:
a first support including:
a leg member,
a first pad coupled to the leg member,
a support member coupled to at least one of the leg member or the first pad, and
a bracket operably coupled to the leg member, the bracket having a first surface and a second surface extending transversely from the first surface;

a second support pivotably coupled to the first support, the second support including:
an arm member, and
an extendable member coupled to the arm member, the extendable member having a second pad; and
a handle operably coupled to the first support and the second support, the handle being configured to transition the second support between a clamped state and an unclamped state, wherein in the clamped state, a tire of a bicycle is secured between the first pad and the second pad.

15. The bike rack of claim 14, further comprising a fastener, and wherein the bracket is operably coupled to the leg member via the fastener.

16. The bike rack of claim 15, wherein the leg member includes a hole within which the fastener is disposed;
wherein the bracket includes a receptacle; and
wherein the fastener is disposed through the hole of the leg member to engage with the receptacle of the bracket to operably couple the bracket to the leg member.

17. The bike rack of claim 14, further comprising at least one of:
a third pad disposed on the first surface of the bracket, or
a fourth pad disposed on the second surface of the bracket.

18. The bike rack of claim 14, wherein the bracket further has a third surface extending transversely from the second surface of the bracket; and
wherein at least a portion of the third surface is oriented in a same direction as the first surface.

19. The bike rack of claim 14, wherein, when the bracket is operably couple d to the leg member, the second surface of the bracket is spaced apart from the leg member.

20. The bike rack of claim 14, further comprising an additional leg member configured to extend at varying lengths from the leg member.

* * * * *